United States Patent
Moon et al.

(10) Patent No.: US 6,799,234 B1
(45) Date of Patent: Sep. 28, 2004

(54) APPARATUS AND METHOD FOR RANDOMLY ASSIGNING SLOTS IN A PCI BACKPLANE

(75) Inventors: Billy Gayle Moon, Morrisville, NC (US); Mark Schnell, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 463 days.

(21) Appl. No.: 10/035,553

(22) Filed: Oct. 27, 2001

(51) Int. Cl.[7] .................. G06F 13/00; G06F 13/36
(52) U.S. Cl. .............. 710/110; 710/104; 710/117; 710/268
(58) Field of Search ................. 710/110, 310, 710/313, 314, 100, 200, 104, 8; 711/137, 169; 713/1, 2

(56) References Cited

U.S. PATENT DOCUMENTS

| | | | |
|---|---|---|---|
| 5,758,171 A | * | 5/1998 | Ramamurthy et al. ...... 713/300 |
| 6,055,598 A | * | 4/2000 | Lange ....................... 710/310 |
| 6,457,069 B1 | * | 9/2002 | Stanley ........................ 710/8 |

OTHER PUBLICATIONS

PC/104—Plus Specification, Version 1.0, Feb. 1997, PCI Special Interest Group, P.O. Box 14070, Portland, OR 97214.
Ohio State University, "The Serial Peripheral Interface [subtitled] Nautilus Chip—Project DEEPSEA (Digital Exportation of an Established Protocol from Sensing Encoded Analog)" [online], Jan. 7, 2001, retrieved from the internet on Sep. 5, 2001: <URL:http://eewww.eng.ohio-state.edu/ie/main/current_research/SPI_Nautilus_chip/>.

* cited by examiner

*Primary Examiner*—Glenn A. Auve
*Assistant Examiner*—Christopher E. Lee
(74) *Attorney, Agent, or Firm*—Charles E. Krueger

(57) ABSTRACT

A system and method for automatically assigning resources to a slave device inserted into a PCI backplane utilizes pairs of PCI GNT/REQ lines as bus lines of a time division multiplexed multiplexer control bus. The slave device generates a random delay number and utilizes the number to select an unassigned time slot to be assigned to the slave device. Configuration data is transferred to the slave utilizing the already existing PCI GNT/REQ lines so that no additional bus lines and card space are required to automatically assign resources to the slave device.

15 Claims, 5 Drawing Sheets

APPARATUS AND METHOD FOR RANDOMLY ASSIGNING SLOTS IN A PCI BACKPLANE

BACKGROUND OF THE INVENTION

Cards inserted in devices utilizing a PCI backplane, for example in routers, must be configured and assigned specific resources in the backplane such as "ID select" lines, IRQs, memory regions, and DMA channels.

In all PCI devices using a PCI bus various means have been devised to solve this problem.

In some architectures, the problem is solved by having an "additional" bus in parallel to the PCI bus. For example, this additional bus may be a Serial Peripheral Interface (SPI) bus which is a serial bus for eight and sixteen bit data transfer operations. There are separate data lines for transmission and reception and a device coupled to the bus may be a transmitter or a receiver. The devices connected to the SPI bus may be classified as Master or Slave. A Master device initiates an information transfer on the bus and generates clock and control signals. A Slave device is controlled by a Master through a slave select (chip enable) line. Generally, a dedicated select line is required for each slave device.

In such architectures, each inserted card is assigned an SPI bus chip select line by its physical placement in a router. A protocol implemented on the SPI bus is then used to discover and assign the cards to specific PCI resources. This technique has the disadvantage that it requires an additional bus to do the discovery and assignment of cards on the PCI back plane.

In the PC104+ standard (which is a small form factor stackable PC architecture), PCI resources are assigned with a rotary switch or dipswitch on each daughter card. For example, if four cards are stacked then the stack shares four IDSEL lines, 3 pairs of GNT/REQ lines (modules 3 and 4 share one pair of GNT/REQ lines) and a pair of INTA, INTB, INTC, and INTD lines. The rotary switches on each of the stacked modules control multiplexers that assign specific lines to specific ones of the stacked modules. This is problematic because manual configuration errors may arise and can cause the whole system to malfunction. It also requires manual actions to deploy the cards properly.

In the PC104+ form factor, card space is at a premium, therefore using the technique of having a "parallel" bus to the PCI bus is expensive. Doing so would consume a great deal of additional board space for the stackable headers.

Accordingly, a new approach to "automatically" discover and assign PCI resources to cards inserted into backplane slots, such as PC104+ cards, that doesn't consume scarce resources, such as card space, is needed.

BRIEF SUMMARY OF THE INVENTION

According to one aspect of the invention, cards inserted into a PCI backplane are "automatically" assigned to resources on the PCI bus.

According to another aspect of the invention, automatic rather than manual resource allocation is implemented without requiring the addition of another bus in parallel with the PCI back plane to assign PCI resources.

According to another aspect of the invention, a multiplexer control bus utilizes existing pairs of bus lines in the PCI backplane as bus lines. The multiplexer control bus is a time division multiplexed bus with time slots aggregated into frames. Thus, no additional bus lines and card space are required to automatically configure and assign bus resources to the slave devices.

According to another aspect of the invention, the multiplexer control bus utilizes the PCI GNT/REQ lines as bus lines.

According to another aspect of the invention, the slave device selects slots based on a random delay number based on the time of charging of a low precision charging circuit.

According to another aspect of the invention, if two slave devices select the same time slot the master device asserts a reset signal.

According to another aspect of the invention, if two or more slave devices generate the same random delay number then a counting circuit is adjusted to more accurately measure the charging interval.

Other features and advantages of the invention will be apparent in view of the following detailed description and appended drawings.

DETAILED DESCRIPTION OF THE PREFERRED EMBODIMENTS

The invention will now be described with reference to the preferred embodiments. The embodiment described below is implemented, by way of example not limitation, utilizing a PC104+ bus and an SPI bus protocol for transferring configuration information. The invention has broad utility in other areas of technology as will be apparent to persons of skill in the art.

Figure 1:
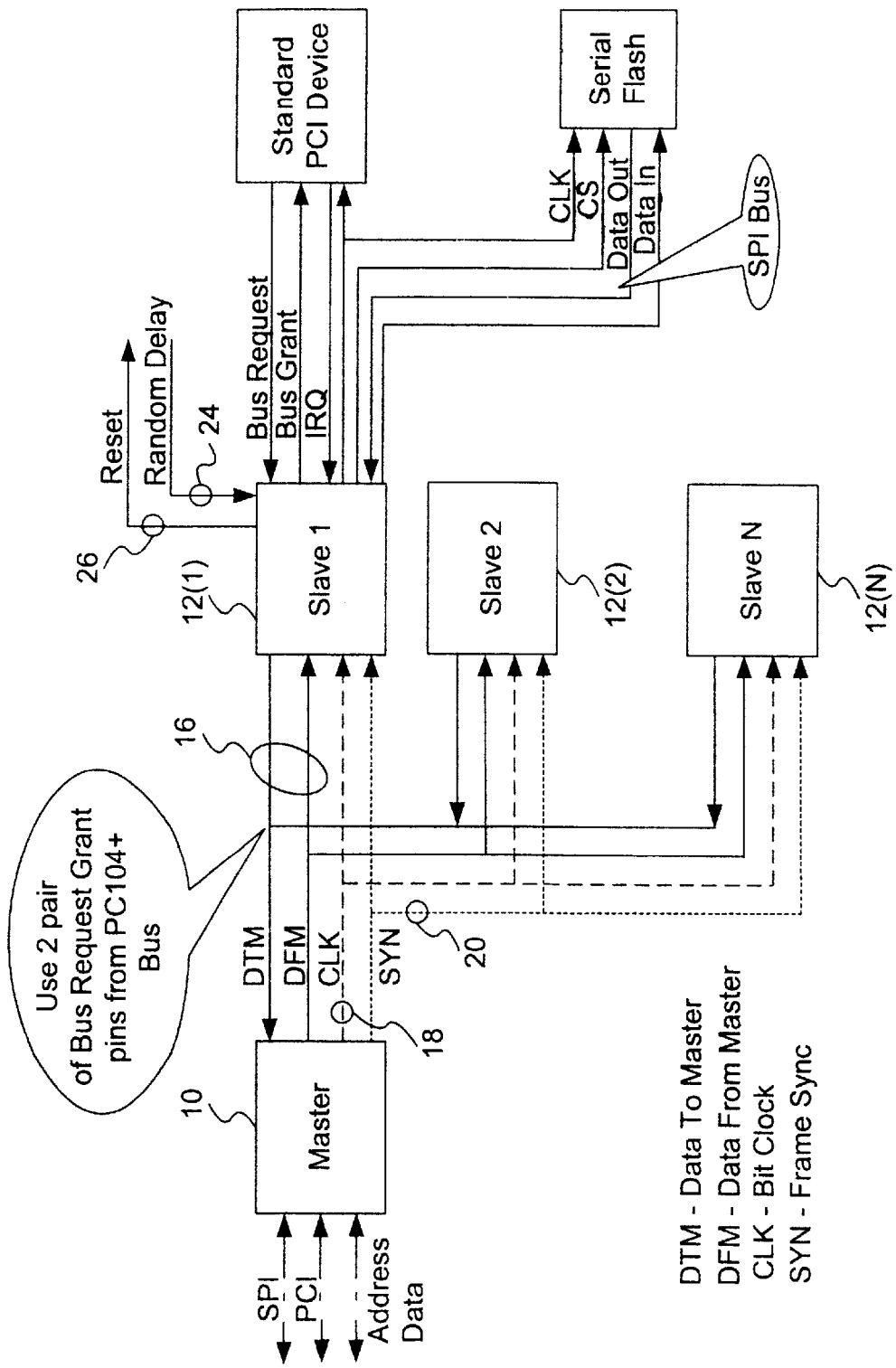
FIG. 1 is a system block diagram of a preferred embodiment.

FIG. 1 is a block diagram of a preferred embodiment. In FIG. 1 the Master 10 is, for example, a network control card and the slaves 12 are stacked PC104+ cards. As described above, 3 pairs of GNT/REQ signal lines are assigned to each stack of PC104+ cards. A multiplexer bus (MBUS) 16 is a time division multiplexed (TDM) bus that utilizes GNT/REQ 0 and GNT/REQ1 lines to form a four-bit bus. The CLK 18 is the PCI bus clock and SYN 20 is used by the Master 10 to define frames as described more fully below.

Each slave also includes a Random Delay Input Pin 24 and a Reset Pin 26. The functions of these pins are described below. As is known in the art, the master and slave devices include connectors for electrically coupling the devices to the backplane.

The PCI control signal multiplexer bus 16 allows multiplexing of PCI control signals on the two pairs of PCI control signal lines (bus request/bus grant). The control bus consists of a number of time slots aggregated into a frame. Each PCI slave device (that wishes to bus master) is assigned one of the time slots using the automatic time slot assignment mechanism that is described below.

Figure 2:
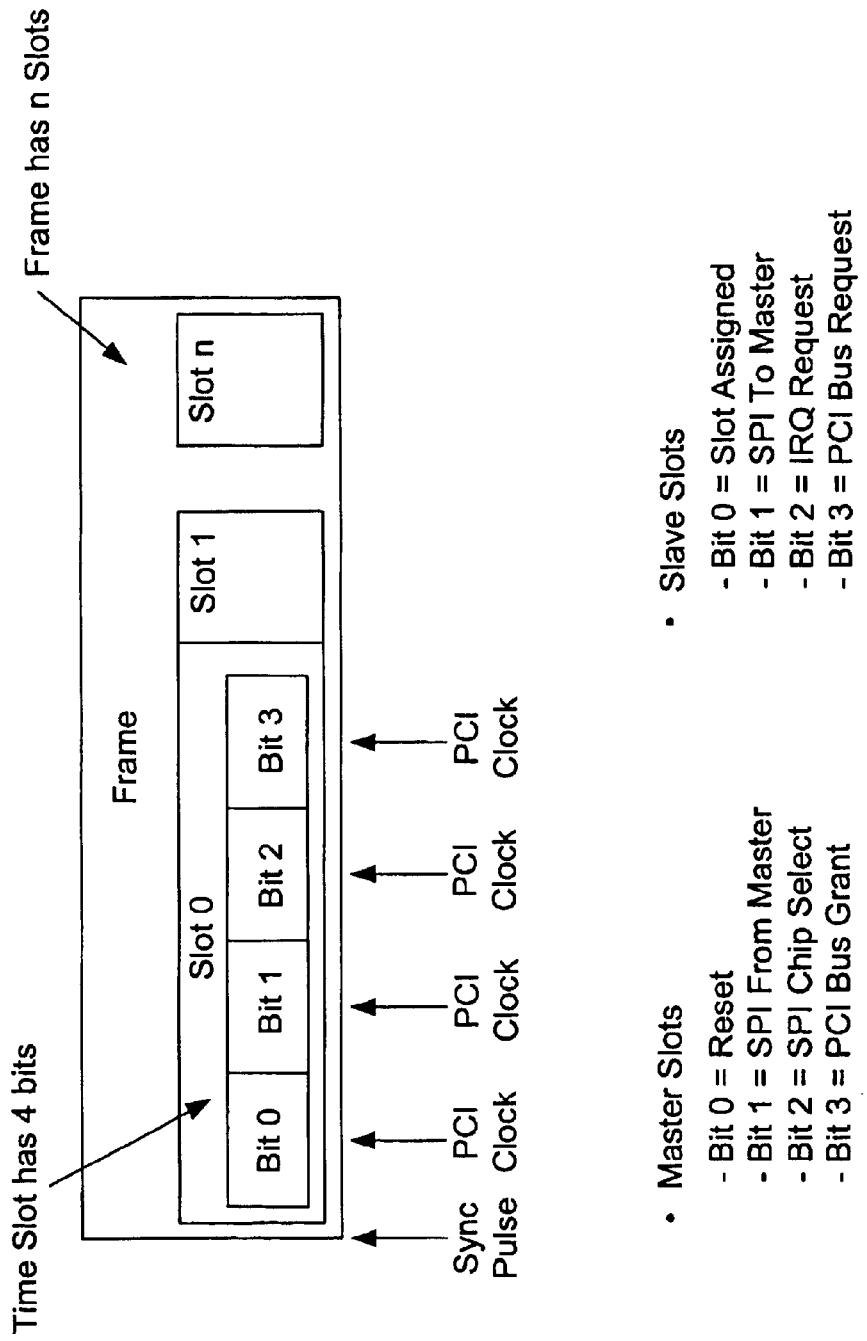
FIG. 2 is a block diagram depicting the bit positions is a TDM time slot.

The time slots are depicted in FIG. 2. Each time slot includes four bits. From the master, the four bits contain a RESET, SPI Data from Master, SPI chip select, and Bus Grant. From the slave, the four bits contain a SLOT ASSIGNED, SPI Data to Master, IRQ, and Bus Request.

The master controls the number of fixed duration time slots in a frame by controlling the interval between assertion of the SYNC signal.

The TDM multiplexer bus 16 allows multiple slaves to communicate with the master utilizing the two pairs of PCI bus lines that are already on the backplane and included in the PC104+ format. Configuration data is transferred via Bit 1 of each time slot and GRANT/REQ signals are transferred via Bit 3. The SPI chip select is asserted by the Master in Bit 2 of the time slot appropriated to the slave and the slave can request an interrupt utilizing Bit 2. The master provides the multiplexing clock and frame sync.

Figure 3:
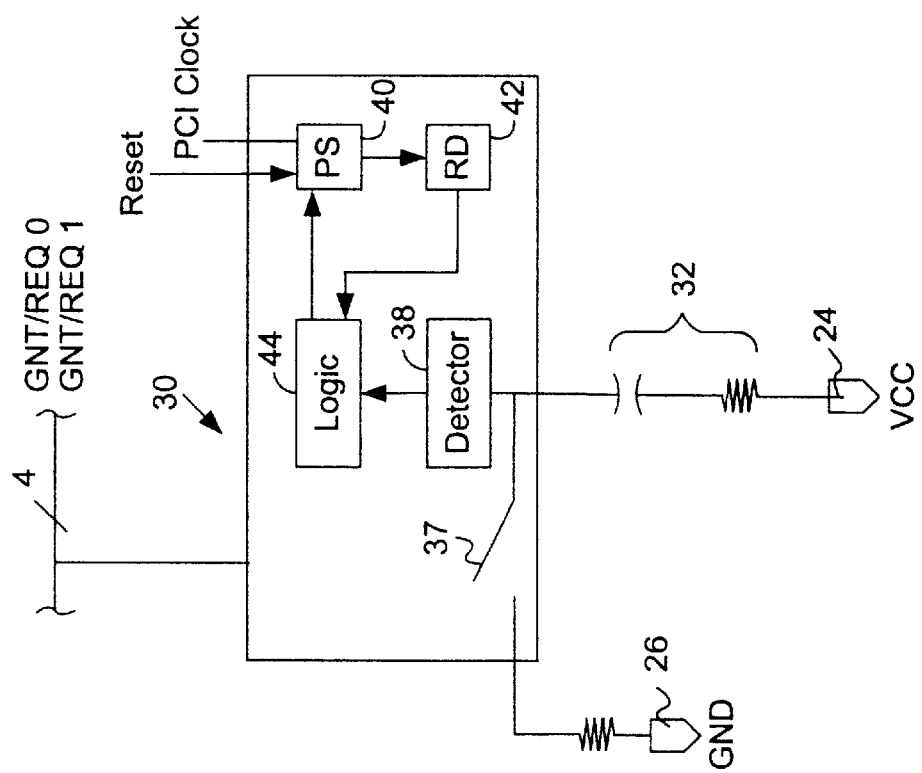
FIG. 3 a block diagram of the slave multiplexer control unit.

The following describes a technique for automatically assigning bus slots to the slaves without operator intervention. Referring to FIG. 3, each slave device includes a multiplexer control chip 30 having an input port coupled to a low quality (20% tolerance) RC circuit 32 tied to the random delay input pin 24. In addition, the multiplexer control chip has a reset port coupled through a 20% tolerance resistor to the Reset pin 26. The reset pin is coupled to the RC circuit by a switch 37, which is closed when the Reset signal in the time slot assigned to the slave is asserted for a period of time that is determined by the master. Additionally, a threshold voltage sensor 38 outputs a counter stop signal when the RC 32 is charged. A pre-scalar counter (PS) 40 is coupled to count PCI clocks. A random delay counter (RD) 42 is coupled to the PS 40.

The multiplexer control chip 30 is coupled to the multiplexer control bus lines (GNT0/REQ0 and GNT1/REQ1) and to the SYNC line. The SYNC line defines a frame of fixed duration time slots. The multiplexer control chip 30 includes control logic 44 for reading and asserting the bit position in each time slot.

Figure 4:
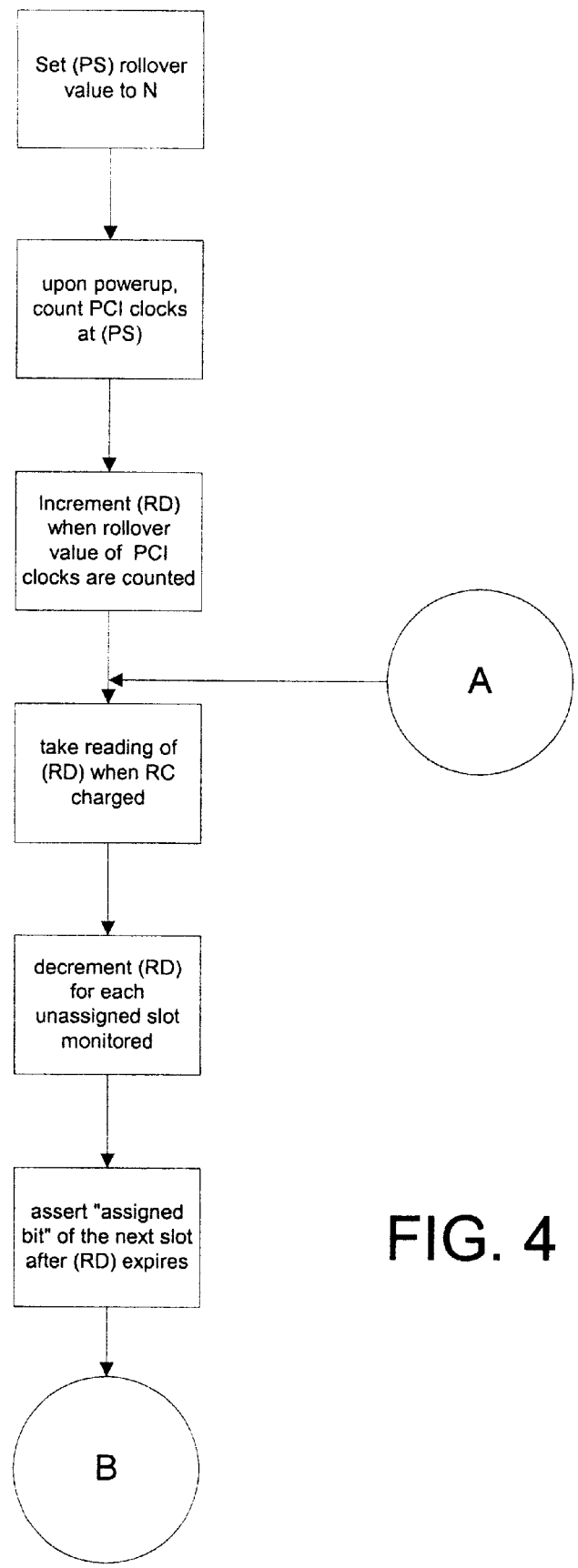
FIGS. 4 and 5 are flow charts depicting the steps of the time slot selection process.
Figure 5:
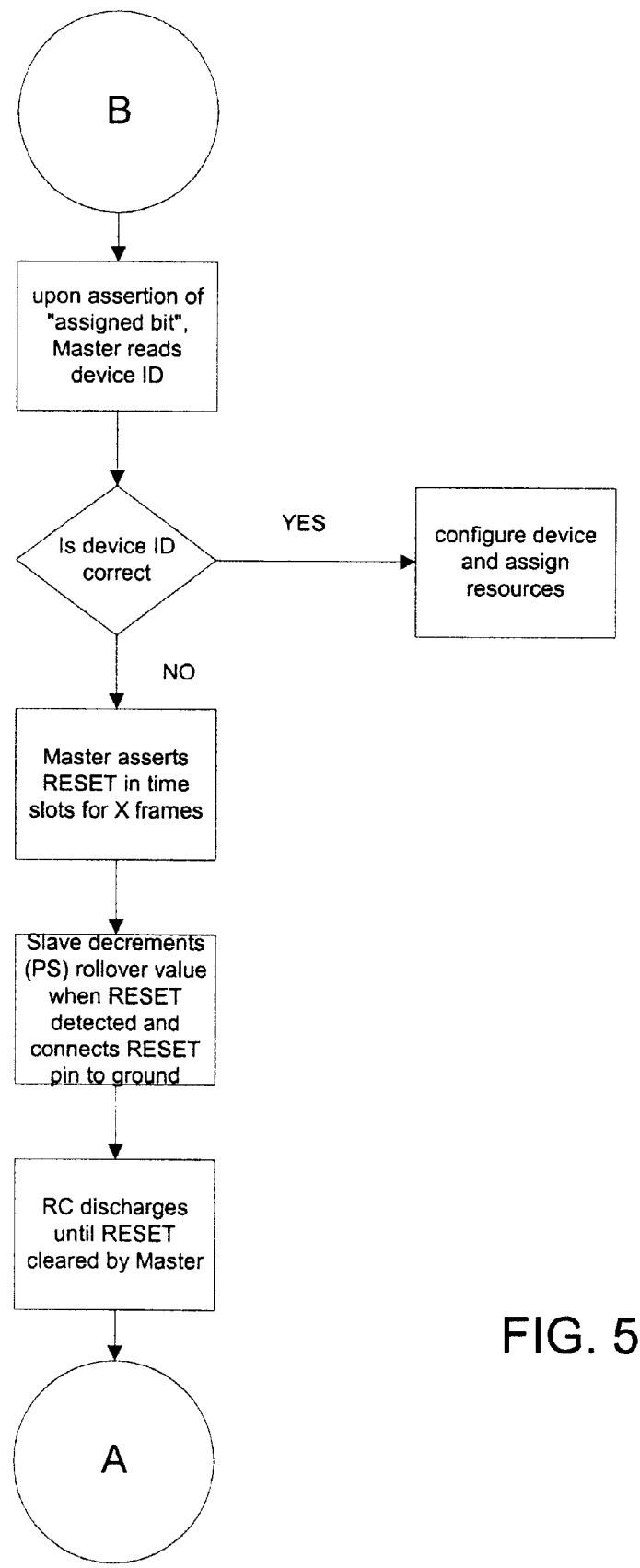

An embodiment of the technique for assigning TDM time slots to the slaves will now be described with reference to FIG. 3 and the flow charts of FIGS. 4 and 5.

On power up, VCC charges the RC 32 and the time for RC 32 to reach a specified threashold is randomly determined by the exact values of the components of the RC 32. After some time interval, the random input pin is detected high by threshold voltage sensor 38 on the slave multiplexer control chip 30. During the time that it takes to charge the RC 32, the slave device counts PCI clocks using the following logic.

The PCI clock is counted by the pre-scalar counter (PS) 40, each time the PS counts the specified number of clocks (the "roll over value"), then the Random Delay counter (RD) 42 is ticked once. Each time the system is reset, the roll over value of the PS counter is decremented by 1 (2's complement roll over is assumed). Finally, the Random Delay Counter 42 is also a 2's complement roll over counter.

After the first reset, the slave multiplexer control chip control logic 44 loads the PS with all ones to set the roll over value to a maximum value, clears the Delay Counter, and begins monitoring the random delay input pin. Normal process variation of the 20% precision resistor and capacitors causes RD to expire at a random number of RD ticks.

When the random delay input is triggered, the slave multiplexer control chip control logic 44 takes the reading of the RD 42, and begins monitoring the multiplexer bus's slave time slots. For each time slot that passes with the "assigned bit" clear (meaning the time slot is un-assigned), the slave multiplexer control chip control logic 44 decrements its RD counter 42. When the RD counter expires, the slave multiplexer control chip control logic notes the next time slot, waits for one frame delay, and attempts to assert the "assigned bit" of that slot.

At this point, the master detects the newly assigned slave time slot (by noting that the slot changed for un-assigned to assigned) and attempts an SPI bus read of an ID register from that slave, thus "automatically" discovering the slave. The master asserts the chip select bit in the time slot assigned to the slave and the slave reads out one bit of its ID into the SPI To Master bit slot (Bit 1) during each successive assigned time slots.

If more than one slave selected the same assigned time slot, the master will detect the fact via a frame check sequence error on the SPI data. Having detected an error, the master issues a "reset" signal to that time slot in the next frame. The duration of the reset signal (in slots) is variable and will follow an exponential binary table (1 frame, 2 frames, 4 frames, 8 frames, etc.) as subsequent collisions are detected.

When the slave multiplexer control chips of the colliding slaves 30 detect the reset signal on their selected time slot, their switches 37 are closed to connect the reset pins their RC 32 via an additional 20% tolerance resistor and the rollover value in their PD counter 40 is decremented. The duration of the reset signal will determine how long the switch 37 is closed. The amount of time that the RC 32 is discharged will introduce an additional random weighting to the RC 32 since the starting value of the RC will no long be zero volts for each slave. When the reset bit is released by the master, the switch 37 is opened and the slave counters will once again begining counting as described earlier until the RC is charged to the threshold level.

Since the PS counter roll over value is lowered when the Reset bit in the assigned time slot is asserted, each subsequent attempt at picking a random clock will look at finer detail to scatter slaves that have similar tolerance parts. For example, if the roll over value were N then the error of the detection of the occurrence of the threshold voltage could be up to N PCI clocks. When the rollover value is decremented this error value is reduced to (N−1) PCI clocks. Eventually the error value will be reduced sufficiently to distinguish between the charging times of the RCs coupled to different slaves. By examining the most significant bits of the delay time first, the average time before all devices are detected is minimized since it is less likely that the slave devices will have similar time delays.

The invention has now been defined with reference to the preferred embodiments. Alternatives and substitutions will now be apparent to persons of skill in the art. For example, different techniques can be utilized to generate the random number as is known in the art. Further, different procedures for selecting a slot based on the random number can be used. Additionally, the multiplexed bus may be generated over DC power pins by manchester encoding the described Multiplexed buses and AC coupling them to the power bus rather than physically multiplexing the SYNC/GRNT/RQST lines. The particular format of the time slot is not critical to the invention. Accordingly, it is not intended to limit the invention except as provided by the appended claims.

What is claimed is:

1. A method for assigning resources to slave devices coupled to a PCI backplane, with at least one master device and multiple slave devices coupled to first and second GNT/REQ line pairs that form bus lines of a multiplexing control bus including multiple time slots, each time slot comprising a plurality of bit positions, aggregated into a frame, said method comprising the acts of:

at the slave device:
generating a random delay number based on an elapsed time interval from the time the slave device is reset;

detecting unassigned time slots and decrementing the random delay number for each unassigned time slot detected;

upon expiration of the random delay number, asserting an assigned bit in a detected unassigned time slot to select an assigned time slot;

at the master device:

upon detecting that the slave device has asserted the assigned bit, asserting a chip select bit in the assigned time slot and reading slave ID data from the slave device utilizing a data bit in the assigned time slot;

subsequent to reading the slave ID device data, utilizing the chip select bit and data bit in the assigned slot to load data into configuration registers on the slave device.

2. The method of claim 1 where the act of generating a random delay number at the slave device further comprises the acts of:

providing a charging circuit that begins charging when the slave device is reset;

counting clock signals from the time the slave device is reset until the charging circuit is charged to a specified voltage level; and utilizing a number of clocks counted as the random delay number.

3. The method of claim 2 where the act of counting clock signals further comprises the steps of:

asserting a pre-scalar (PS) output signal each time a roll over number of clock signals is counted; and incrementing a random delay number value each time a PS output signal is asserted until the charging circuit is charged to the specified voltage level.

4. The method of claim 3 further comprising the acts of:

at the master device:

detecting whether more than one slave device has asserted the assigned bit in the assigned time slot;

if yes:

asserting a reset bit in a reset bit position of the assigned time slot;

at the slave:

reducing the value of the roll over number by a specified number when the bit in the reset bit position is asserted.

5. The method of claim 4 where the act of detecting whether more than one slave device has asserted the assigned bit further comprises the acts of:

determining whether ID data read from the slave device is correct.

6. A system for assigning bus resources to slave devices, said system comprising:

a multiplexing control bus, having first and second PCI GNT/REQ line pairs as bus lines, with the multiplexing control bus including multiple time slots, each comprising a plurality of bit positions, aggregated into a frame;

a master device, coupled to the multiplexing control bus and including a master multiplexer control unit having logic for defining frames and time slots, for monitoring the multiplexing control bus time slots, for reading, setting, and resetting bits in said time slots and for initiating serial data transfers, for utilizing a bit position in a time slot assigned to a particular slave device for performing serial data transfers to read ID data from the slave device and configure a slave device and assigning bus resources to the slave device;

slave device coupled to a PCI backplane;

a charging circuit;

an input pin coupling the charging circuit to a first power supply terminal;

a threshold signal generator coupled to the charging circuit for asserting a counter stop signal when the charging circuit is charged to specified threshold voltage;

a counting unit for counting clock signals, with the counting unit coupled to receive the counter stop signal, where the counting unit starts counting clocks when the slave device is reset and stops counting clocks when the counter stop signal is asserted to generate a random delay number;

a slave multiplexer control unit, included in the slave device and coupled to the bus lines of the multiplexer control bus and to the counting unit to receive the random delay number, with the slave multiplexer control unit including logic for monitoring the multiplexing control bus time slots, reading, setting, and resetting bits in said time slots, the multiplexer control unit further including logic for selecting an unassigned time slot as an assigned slot for the slave device by detecting unassigned time slots and decrementing the random delay number for each unassigned time slot detected, and upon expiration of the random delay number, asserting an "slot assigned" bit in a detected unassigned time slot to assign the time slot to the slave device.

7. The system of claim 6 further comprising:

an output pin coupled to a second power supply terminal;

a switch having a first terminal coupled to the output pin via a resistor and a second terminal coupled to the charging circuit;

the counting unit further comprising:

a pre-scalar counter loaded to a specified rollover number when the slave device is reset, with the pre-scalar counter for incrementing a pre-scalar count value each clock and asserting a roll over signal when its count value is equal to the roll over value;

a random number counter, coupled to receive the roll over signal, for incrementing a random delay count value each time the pre-scalar counter rolls over, and having a stop count input coupled to receive the counter stop signal from the threshold signal generator, where the random delay count value is equal to the random delay number when the threshold signal is asserted;

where the master multiplexer control unit further comprises:

logic for setting a reset bit in specific time slot if more than one slave device has asserted the "slot assigned" bit in the specific time slot;

where the slave multiplexer control unit further comprises:

logic for closing the switch to couple the charging circuit to the output pin when a reset signal is asserted, for opening the switch, starting the pre-scalar counter, and reducing the value of the roll over value by a decrement value when the reset signal is reset.

8. The system of claim 6 where:

said slave device is a PC104+ form factor card.

9. A system for assigning resources to slave devices coupled to a PCI backplane, with at least one master device and multiple slave devices coupled to first and second GNT/REQ line pairs that form bus lines of a multiplexing control bus including multiple time slots, each comprising a plurality of bit positions, aggregated into a frame, said system comprising:

at the slave device:
means for generating a random delay number based on an elapsed time interval from the time the slave device is reset;
means for detecting unassigned time slots and decrementing the random delay number for each unassigned time slot detected;
means for, upon expiration of the random delay number, asserting an assigned bit in a detected unassigned time slot select an assigned time slot;

at the master device:
means for, upon detecting that the slave device has asserted the assigned bit, asserting a chip select bit in the assigned time slot and reading slave ID data from the slave device utilizing a data bit in the assigned time slot;
means for, subsequent to reading the slave ID data, utilizing the chip select bit and data bit in the assigned slot to load data into configuration registers on the slave device.

10. A system for automatically assigning bus resources to a slave device coupled to a PCI backplane, said system comprising:

a master device, coupled to first and second PCI GNT/REQ lines, having logic for defining a time division multiplexed control bus having multiple time slots aggregated into frames;
a slave device, coupled to the first and second PCI GNT/REQ lines, having logic for randomly selecting an unassigned time slot to be associated with the slave device so that the master device can read ID data from the slave device and configure the slave utilizing the assigned time slot;
so that the slave device can be configured automatically without requiring extra bus lines.

11. A slave device, for use in a system that assigns resources to slave devices coupled to a PCI backplane, with at least one master device and one slave device coupled to first and second GNT/REQ line pairs that form bus lines of a multiplexing control bus including multiple time slots, each comprising a plurality of bit positions, aggregated into a frame, said slave device comprising connectors for coupling the slave device to the first and second PCI GNT/REQ lines;
logic for randomly selecting an unassigned time slot to be associated with the slave device so that the master device can read ID data from the slave device and configure the slave utilizing the assigned time slot.

12. A method for assigning resources to slave devices coupled to a PCI backplane, with at least one master device and multiple slave devices coupled to first and second backplane line pairs that form bus lines of a multiplexing control bus including multiple time slots, each time slot comprising a plurality of bit positions, aggregated into a frame, said method comprising the acts of:

at the slave device:
generating a random delay number based on an elapsed time interval;
detecting unassigned time slots and decrementing the random delay number for each unassigned time slot detected;
upon expiration of the random delay number, asserting an assigned bit in a detected unassigned time slot to select an assigned time slot;

at the master device:
upon detecting that the slave device has asserted the assigned bit, reading slave ID data from the slave utilizing a data bit in the assigned time slot;
subsequent to reading the slave ID data, utilizing the the assigned time slot to load data into configuration registers on the slave device.

13. A system for assigning resources to slave devices coupled to a PCI backplane, with at least one master device and multiple slave devices coupled to first and second backplane line pairs that form bus lines of a multiplexing control bus including multiple time slots, each time slot comprising a plurality of bit positions, aggregated into a frame, said method comprising the acts of:

at the slave device:
means for generating a random delay number based on an elapsed time interval;
means for detecting unassigned time slots and decrementing the random delay number for each unassigned time slot detected;
means for, upon expiration of the random delay number, asserting an assigned bit in a detected unassigned time slot to select an assigned time slot;

at the master device:
means for, upon detecting that the slave device has asserted the assigned bit, reading slave ID data from the slave device utilizing a data bit in the assigned time slot;
means for, subsequent to reading the slave ID data, utilizing the the assigned time slot to load data into configuration registers on the slave device.

14. A method for automatically discovering a slave device and assigning bus resources to the slave device coupled to a PCI backplane, said method comprising the acts of:

at the master device:
defining a time division multiplexed control bus, utilizing first and second PCI bus lines, having multiple time slots aggregated into frames;

at a slave device, coupled to the first and second PCI bus lines:
randomly selecting an unassigned time slot to be associated with the slave device so that the master device can read ID data from the slave device and configure the slave utilizing the assigned time slot;
so that the slave device can be discovered and configured automatically without requiring extra bus lines.

15. A system for automatically discovering a slave device and assigning bus resources to the slave device coupled to a PCI backplane, said system comprising:

at the master device:
means for defining a time division multiplexed control bus, utilizing first and second PCI bus lines, having multiple time slots aggregated into frames;

a slave device, coupled to the first and second PCI bus lines:
means for randomly selecting an unassigned time slot to be associated with the slave device so that the master device can read ID data from the slave and configure the slave device utilizing the assigned time slot;
so that the slave device can be discovered and configured automatically without requiring extra bus lines.

* * * * *